United States Patent
Hauske et al.

(10) Patent No.: US 8,725,007 B2
(45) Date of Patent: May 13, 2014

(54) METHOD AND ARRANGEMENT FOR ADAPTIVE DISPERSION COMPENSATION

(75) Inventors: Fabian Hauske, Woerthsee (DE);
Maxim Kuschnerov, Munich (DE);
Berthold Lankl, Egmating (DE);
Bernhard Spinnler, Oberhaching (DE)

(73) Assignee: Xieon Networks S.A.R.L., Luxembourg (LU)

( * ) Notice: Subject to any disclaimer, the term of this patent is extended or adjusted under 35 U.S.C. 154(b) by 103 days.

(21) Appl. No.: 13/202,665

(22) PCT Filed: Feb. 20, 2009

(86) PCT No.: PCT/EP2009/052083
§ 371 (c)(1),
(2), (4) Date: Aug. 22, 2011

(87) PCT Pub. No.: WO2010/094342
PCT Pub. Date: Aug. 26, 2010

(65) Prior Publication Data
US 2011/0305453 A1      Dec. 15, 2011

(51) Int. Cl.
*H04B 10/06*     (2011.01)
(52) U.S. Cl.
USPC ............................. 398/208; 398/203; 398/204

(58) Field of Classification Search
USPC .................................................. 398/202–214
See application file for complete search history.

(56) References Cited

U.S. PATENT DOCUMENTS

| | | |
|---|---|---|
| 2004/0136731 A1 | 7/2004 | Wang et al. |
| 2007/0009260 A1 | 1/2007 | Bothwell et al. |
| 2007/0092260 A1* | 4/2007 | Bontu et al. .................. 398/152 |
| 2009/0028576 A1* | 1/2009 | Elahmadi et al. ............. 398/147 |
| 2009/0148164 A1* | 6/2009 | Roberts et al. .................. 398/65 |
| 2009/0201796 A1* | 8/2009 | Roberts et al. ................ 370/210 |

FOREIGN PATENT DOCUMENTS

| | | |
|---|---|---|
| WO | 03/052977 A1 | 6/2003 |
| WO | 2009/070881 A1 | 6/2009 |

* cited by examiner

*Primary Examiner* — Dzung Tran
(74) *Attorney, Agent, or Firm* — Laurence A. Greenberg; Werner H. Stemer; Ralph E. Locher

(57) ABSTRACT

A received optical signal is coherently demodulated and converted into electrical complex samples, which are dispersion compensated in a compensation filter. A control circuit calculates comparison values from corrected samples and an estimated error value. A plurality of compensation functions is applied according to a predetermined dispersion range and after a second iteration, the compensation filter is set to an optimum compensation function.

31 Claims, 5 Drawing Sheets

- ▫ - N=512
- ○ - N=256
- △ - N=128

METHOD AND ARRANGEMENT FOR ADAPTIVE DISPERSION COMPENSATION

FIELD OF THE INVENTION

The invention refers to a method and an arrangement for adaptive dispersion compensation. The invention may be used for all kinds of optical transmission formats including polarisation multiplex transmission.

BACKGROUND OF THE INVENTION

In order to meet the growing demand for internet bandwidth with traffic growth rates around 40-50% per year, telecommunication component providers face the task of increasing the spectral efficiency of fiber utilization. After 10 Gbit/s systems (G-Giga) became successful in the 1990's, solutions for 40 Gbit/s became available in the last years. Standardization and research are now focused on the development of 100 Gbit/s systems with coherent polarization multiplexed (CP) QPSK (Quadrature Phase Shift Keying) being the most likely modulation format for next generation systems. Since polarization multiplexing utilizes both light polarizations, it is possible to send the signal at a rate of ~25-28 G symbols per second, thus fitting nicely into the standard 50 GHz grid for DWDM (Dense Wavelength Diversity Multiplex) optical systems.

E.g. Seb J. Savory, "Digital filters for coherent optical receivers", Optics Express 16, No. 2, pp. 804-817, 9. Jan. 2008 describes the principle of a polarisation diversity multiplex (polmux) transmission system with dispersion compensation.

OBJECTS AND SUMMARY OF THE INVENTION

It is an object of the invention to provide methods and arrangements for adaptive dispersion compensation as well as equalization of arbitrary other linear distortions (e.g. filters) that can be described by a set of transfer functions.

The object is achieved by the features recited in method claims 1, 2, and in arrangement claims 12 and 13. A coherent polarisation diversity multiplex receiver is described in claim 18.

According to the present invention there is provided a method for adaptive dispersion compensation, comprising the steps of
  demodulating a received optical signal and converting it into digital samples,
  feeding the samples to a compensation filter,
  setting the compensation filter to a compensation function according to a dispersion value,
  outputting corrected samples,
  calculating comparison values from the corrected samples,
  calculating an error value from the corrected samples and storing an estimated minimum error value,
  applying further compensation functions according to further dispersion values altered by variations within a predetermined dispersion range, and
  setting an optimal filter compensation function according to the minimum error value.

Because the adaptation length of a time domain equalizer increases exponentially with the signal spread this method is suitable for moderate dispersion values and short transmission links, e.g. up to 200 km.

There is also provided a method for adaptive dispersion compensation comprising the steps of
  demodulating a received optical signal and converting it into digital samples,
  feeding N samples to a FFT unit,
  converting the N samples into a spectral function,
  setting a compensation unit to a compensation function according to a dispersion value,
  converting the corrected spectral function into corrected samples,
  calculating comparison values from the corrected samples,
  calculating an error value from the corrected samples and storing an estimated minimum error value,
  applying further compensation function according to further dispersion values altered by a variation within a predetermined dispersion range, and
  setting an optimal filter compensation function according to the minimum error value.

This method is suited for transmission links, e.g., from 200 km and beyond.

Further advantageous features are described in the pending claims.

Coherent reception makes it possible to compensate for large values of chromatic dispersion using digital signal processing, thus allowing to eliminate optical dispersion compensating fibers, and to reduce the number of amplifiers, saving costs in the system. Dispersion is a linear effect that can be described analytically by an all-pass transfer function. An approximation omitting higher order terms is given by $$G(z, \omega) = \exp\left(-jD\frac{\lambda^2}{2\pi c}\frac{\omega^2}{2}z\right)$$

where D is the dispersion parameter of the fiber in [ps/nm/km], $\lambda$ is the reference wavelength, $\omega$ is the angular frequency offset from the reference frequency, c is the speed of light and z is the transmission distance in km. If the total dispersion given by D·z [ps/nm] is known, the filter can be set to the inverse dispersion value and any arbitrary value of dispersion can be compensated without penalty, if the signal was at least two-fold oversampled. Thus, the estimation of the dispersion value D·z in the receiver without any transmitted training symbols is the key component to fully exploit capabilities of next generation coherent optical systems, a problem that is solved by the invention. In addition, the invention provides the according filter compensation function at the same step.

The estimation algorithm can be implemented either for a time-domain equalizer or for a frequency-domain equalizer, and delivers identical results. Here, shorter links about 70-200 km might be a candidate for moderate-length TDEs (time domain equalizers), whereas longer transmission links starting at 200/300 km should require FDE (frequency domain equalizers) in order to keep complexity low. The advantages of the proposed solution are as follows:
  Estimation is blind and does not require signal overhead, training symbols or a feedback channel to the transmitter,
  No additional correlation filters are necessary,
  The estimation precision is very high,
  The predefined filter functions immediately compensates for the estimated chromatic dispersion thus making it possible to implement a time domain (TD) finite impulse response (FIR) filter with a low number of taps, reducing complexity,
  The adaptation length is in the range of a few microseconds regardless of the actual value of dispersion, The dispersion compensator cannot misconverge, in contrary to straight-forward adaptation algorithms, Computational complexity is very low requiring one multiplication per symbol used for estimation (additions and subtractions can be neglected for complexity computations), and Once the correction filter or the correction unit is set, no continuous update is required. Tapping the signal from time to time, the value of chromatic dispersion can be monitored in an off-line mode.

The invention is applicable for non-coherent and coherent demodulation. Coherent reception enables also the separation of the polarisation component signals of a polarisation diversity signal without a polarisation control. Therefore the invention is especially suited for polarisation multiplex diversity systems.

BRIEF DESCRIPTION OF THE DRAWINGS

Examples of the invention including a presently preferred embodiment are described below with reference to accompanying drawings, where.

DETAILED DESCRIPTION OF THE INVENTION

Different embodiments of the invention suited for different kinds of systems will now be described.

Figure 1:
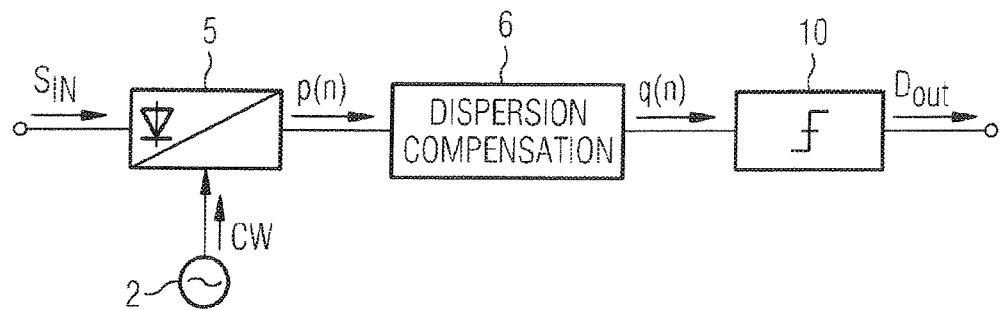
FIG. 1 is a schematic block diagram of receiver.

FIG. 1 shows a schematic bloc diagram of an optical receiver 5,6,10. In a demodulation and conversion unit 5 a received optical signal $S_{IN}$ is converted into digital samples p(n). The digital samples are digitally corrected in a dispersion compensation unit 6 and outputted as corrected samples q(n), which are fed to a decision unit 10 which outputs a data signal $D_{OUT}$.

The invention can also be applied for coherent demodulation. Then a constant wave signal CW is generated by a local oscillator 2 and fed to an adequate demodulation and conversion unit 5. In this case p(n) and q(n) become complex values.

Figure 2:
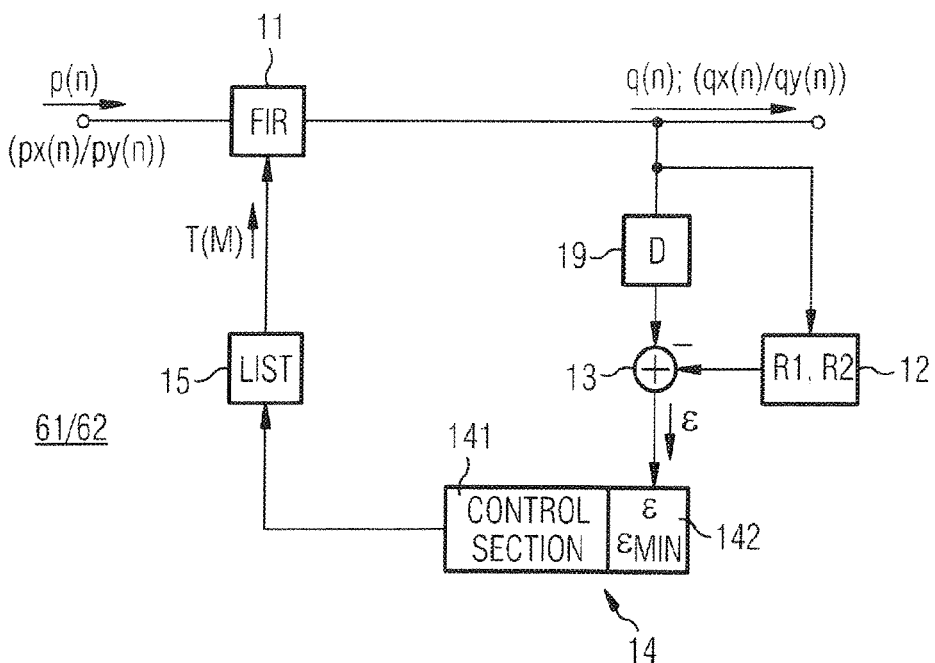
FIG. 2 is a schematic block diagram of a time domain dispersion compensation unit.

FIG. 2 shows a first embodiment of the dispersion compensation unit (equaliser) 61/62 for time domain dispersion compensation. The input samples p(n) may be real or complex samples. Or, if polarisation diversity multiplex modulation is applied, orthogonal samples px(n)/py(n). The samples are fed to a digital M stage FIR compensation filter 11. The dispersion is compensated by an inverse filter function. The filter coefficients are determined and set by applying a filter compensation function. An optimal filter compensation function is determined in a control circuit including a control unit 14, a reference values R1, R2 calculation unit 12, and a comparator 13. A delay element (D) 16 is inserted to indicate correct timing. A plurality of filter compensation functions T(M) corresponding to a plurality of dispersion values is stored in a function storage 15 (or calculated). A control section 141 of the control unit 14 reads these filter compensation functions from the function storage 15 (look up table), and a minimum estimated error value $\epsilon_{MIN}$ is calculated by adder 13 by comparing the corrected samples q(x) and the reference values R1, R2 and stored in an calculation section 142, which is here also a part of the control unit 14. The filter compensation function generating the estimated minimum error value $\epsilon_{MIN}$ is selected for compensation. The corrected samples q(n) or qx(n) and qy(n) are output signals of the compensation filter 11.

Instead of allowing the filter coefficients to adapt freely, thus causing the high risk of a misconverged equalizer, all possible compensation functions for corresponding chromatic dispersion values are preloaded into the function store as a lookup table. The compensation functions correspond to chromatic dispersion values ranging from a minimum to a possible maximum value in the system in certain steps. Initially, each of the compensating functions from the lookup table is applied and the best matching filter function is chosen with the aid of an error criterion defined below.

Figure 3:
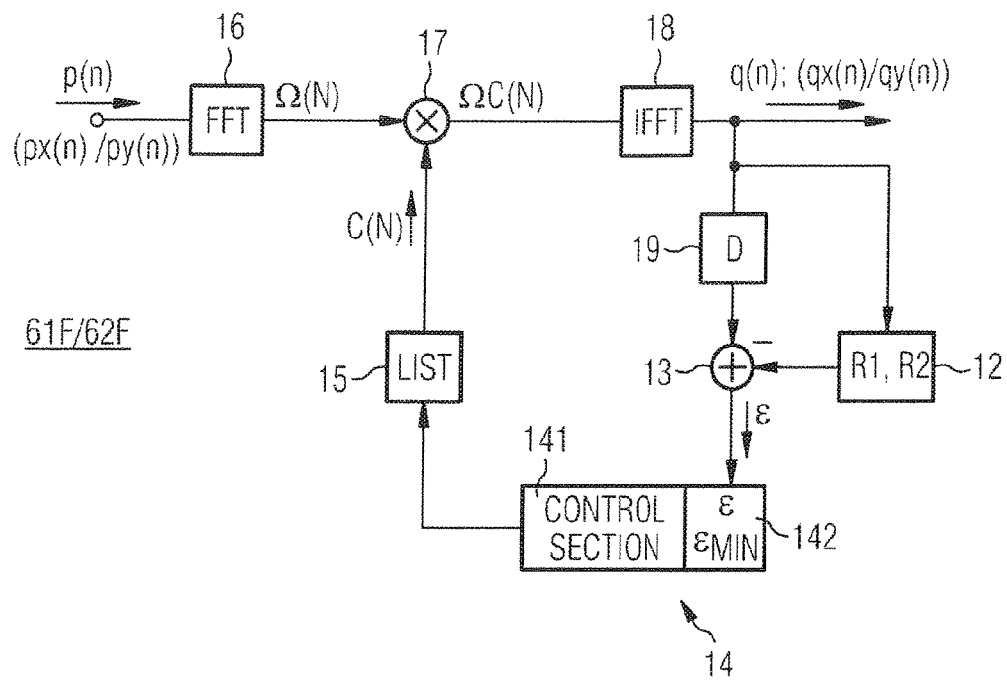
FIG. 3 shows a simplified block diagram of a frequency domain dispersion compensation unit.

FIG. 3 shows an embodiment of a dispersion equaliser 61F/62F for the frequency domain suited for higher dispersion values. For higher dispersion values this arrangement has a complexity advantage over a time domain dispersion compensator.

The real or complex input samples p(n) or px(n)/py(n) are stored in a Fast Fourier Transformation (FFT) unit 16, and N samples together are converted into a spectrum $\Omega(N)$. The N coefficients representing this spectrum are multiplied in a compensation unit 17 by a spectral compensation function C(N). The compensation unit 17 corresponds to the compensation filter 11 in the time domain equaliser. The compensated spectrum $\Omega C(N) = \Omega(N) \cdot C(N)$ is then converted by an Inverse Fast Fourier Transformation (IFFT) unit into corrected real or complex time domain samples q(n) or qx(n)/qy(n).

After the reception of e.g. N/2 new samples p(n), px(n)/py(n) the conversion process is repeated but with another compensation function C(N) corresponding to a different dispersion. Again, the control section 141 of the control unit 14 reads these spectral compensation functions from the function storage 15 and all the spectral compensation functions are tested within a predefined dispersion range. The spectral compensation function generating the estimated minimum error value $\epsilon_{MIN}$ is selected for compensation.

The same algorithm is applied for TDE (time domain equalisation) and FDE (frequency domain equalisation). To calculate estimated errors "$\epsilon$" at least a reference value has to be derived from corrected samples q(n) (px(n), py(n) respectively), which are output signals of the compensation filter 11. The error criterion is derived for the case of two-fold oversampling of the signal according to an article: Dominique N. Godard, "Self-Recovering Equalization and Carrier Tracking in Two-Dimensional Data Communication Systems", IEEE Transactions on Communications, vol. COM-28, No. 11, pp. 1867-1875, November 1980.

The proposed invention however does not utilize the error signal to adapt the coefficients of the compensation function/filter, which improves the convergence properties and at the same time strongly reduces the implementation complexity, but instead tries to minimize the total error power in an error criterion given by $$\varepsilon(CD) = \sum_{n=1}^{N} (||q[2n-1]||^2 - R_1| + ||q[2n]||^2 - R_2|),$$

$$\forall \, W_{CD}(\Omega) = [CD_{min} : \delta CD : CD_{max}],$$

N—number of samples; δCD—dispersion variation, $W_{CD}$ (Ω)—set of possible values for the free parameter (chromatic dispersion CD); reference values $R_1$ and $R_2$ are estimated average values from the power of odd and even corrected samples q(n), unlike conventional adaptation algorithms, thus serving as a basic timing recovery. The values of $R_1$ and $R_2$ follow the changing timing phase, making this approach work in the first place. In order to simplify the evaluation of the above equation in high speed implementations, the values $R_1$ and $R_2$ can also be calculated for example according to the following formula:

| power ratio | $R_1$ | $R_2$ |
|---|---|---|
| $\dfrac{q_{2,av}}{q_{1,av}} > \xi$ | $R_a$ | $R_c$ |
| $\dfrac{1}{\xi} \leq \dfrac{q_{2,av}}{q_{1,av}} \leq \xi$ | $R_b$ | $R_b$ |
| $\dfrac{q_{2,av}}{q_{1,av}} < \dfrac{1}{\xi}$ | $R_c$ | $R_a$ | where $q_{1,av}$ and $q_{2,av}$ are the time averages of the power of the odd and even samples of the corrected signal q(n), and $\xi$, $R_a$, $R_b$, and $R_c$ are constants to be optimized for the specific modulation format, pulse shape etc. $W_{CD}$(Omega) is the set of values of a parameter (e.g. dispersion CD) that are to be examined as possible solutions. The equation is valid for two-fold oversampling. The chosen sampling rate is slightly higher. Of course, more than two-fold oversampling is also possible but difficult because the data rate is high.

A first iteration starts at a chromatic dispersion $CD_{min}$, e.g.=0 ps/nm. The applied dispersion to the compensation filter 11, respectively the compensation unit 18, is increased in steps of δCD (e.g. δCD=200 ps/nm) over all dispersion values of a predetermined dispersion range up to $CD_{max}$. A control section 141 of the unit 14 reads these correction functions from the function storage 15 (look up table). The actual minimum error value $\epsilon_{MIN}$ is stored in the calculation section 142 of the control unit.

Figure 4A:
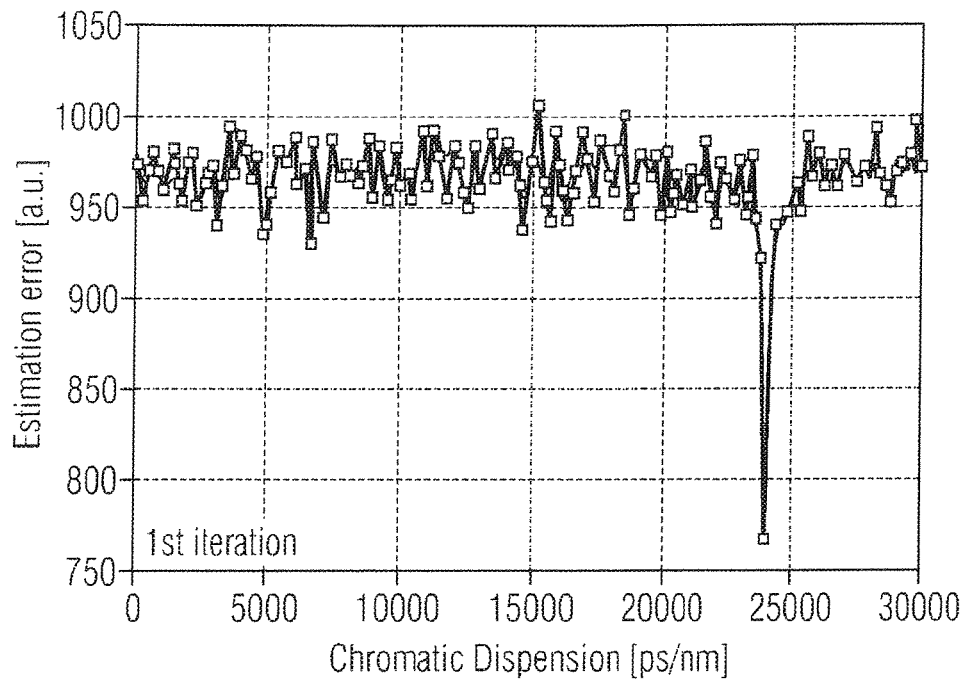
FIG. 4 shows diagrams for a first and second iteration.
Figure 4B:
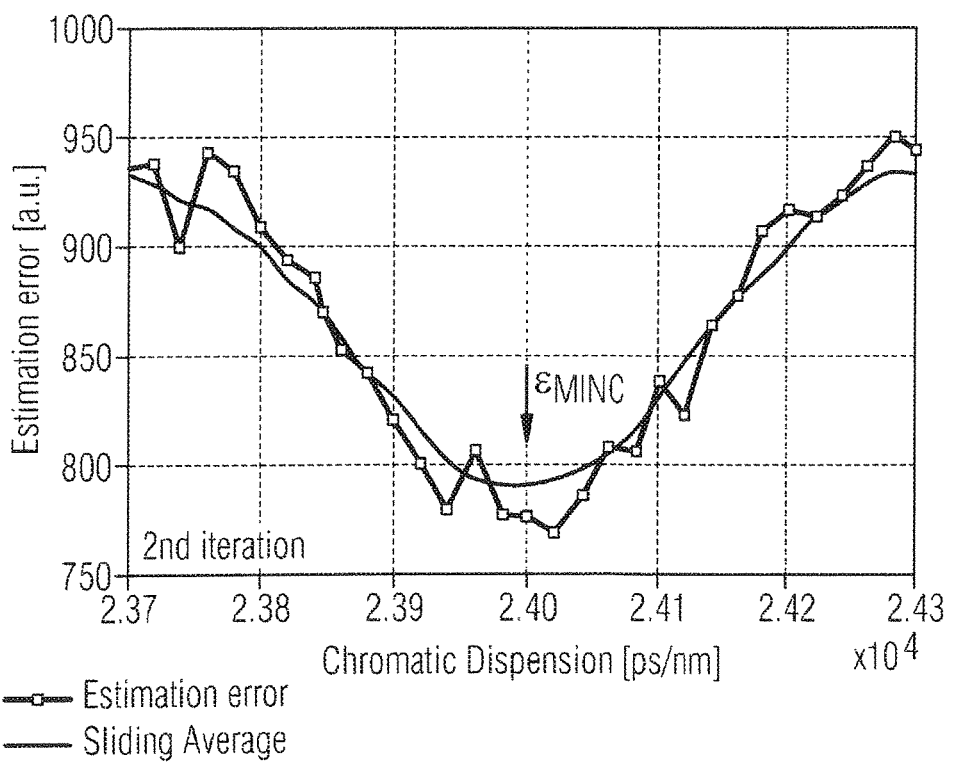

The estimated errors are shown in a diagram FIG. 4 (*a*). The minimum error value $\epsilon_{MIN}$ can easily be recognized.

The error values $\epsilon_{MIN}$ can be used immediately to obtain the optimum solution (corresponding to minimum $\epsilon_{MIN}$) or the error values can be averaged over several consecutive blocks to increase estimation accuracy.

After determining the best inverse dispersion value of the compensation function a second iteration or even further iterations can be repeated with higher resolution in the minimum error range.

The second iteration with a 5-20 times higher resolution of δCD (e.g. δCD=20 ps/nm) is performed in the minimum error range, which can be restricted to ±3×δCD (e.g. ±3×δCD=±600 ps/nm) symmetrically around the optimum found in the previous iteration. The error values and a calculated sliding average error value according to the second iteration are shown in FIG. 4(*b*). A calculated minimum $\epsilon_{MINC}$ of the sliding average error values gives the exact dispersion correction value.

The compensation filter 11 respectively the compensation unit 18 is then set to the optimal compensation function=inverse dispersion value with a lowest error for optimum compensation.

Figure 5:
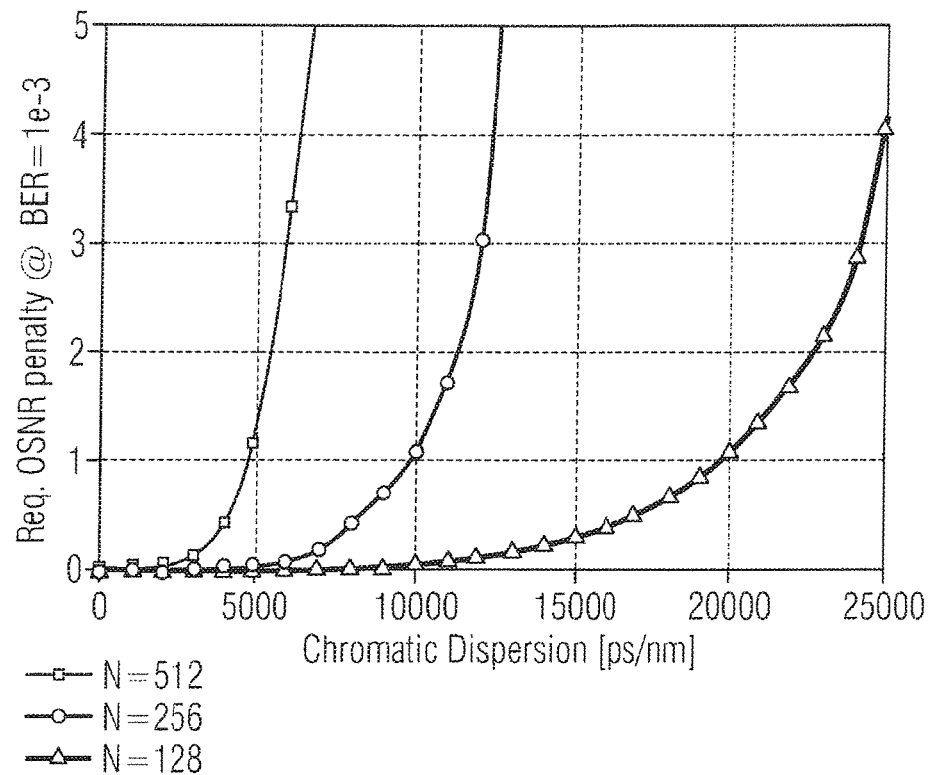
FIG. 5 shows a performance diagram of the frequency domain dispersion compensation unit.

FIG. 5 shows the required OSNR (optical signal to noise ratio) as a function of the chromatic dispersion for a bit error rate of 1 $10^{-3}$. The diagram shows the performance of a system for 112 Gbit/s and several FFT-sizes with N/2 overlap.

The estimation quality is highly precise even in presence of other channel distortions and strong noise and can be further improved for a larger number of symbols used for estimation.

Of course, the invention is especially suited for polmux systems. Therefore, the invention will now be described in detail as a part of a polarisation division multiplex (polmux) transmission system. This system transmits two optical signals with the same carrier wavelength but orthogonal polarisation in a single transmission channel. The received optical polarisation division multiplex signal may be split into the transmitted two optical signals and then demodulated. But this method requires a polarisation control of the received polmux (polarisation division multiplex) signal.

Figure 6:
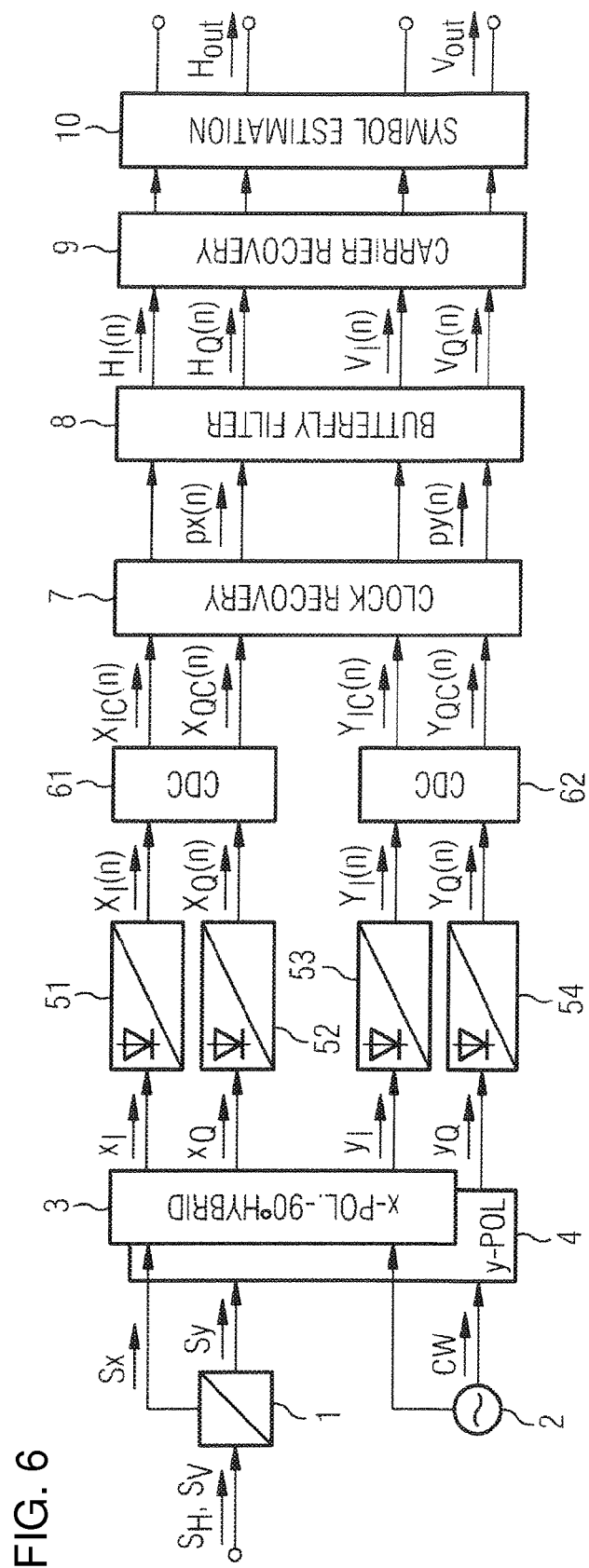
FIG. 6 is a schematic block diagram of a coherent receiver with polarisation demultiplexing.

FIG. 6 shows a schematic block diagram of a today's polarisation division multiplex receiver. A received polmux signal $S_H$, $S_V$ (H—horizontal, V—vertical) carrying the information of a first data signal H and a second data signal V is split by a polarisation beam splitter 1 into two orthogonal component signals Sx with x-polarisation and Sy with orthogonal y-polarisation. A local oscillator 2 generates a constant wave signal which is also split into two orthogonally polarized constant wave signals and fed together with the orthogonal component signals Sx and Sy to two 90°-hybrids 3 and 4, where each orthogonal component signal Sx and Sy is converted into two orthogonal x-components $x_I$, $x_Q$ and into two y-components $y_I$, $y_Q$ respectively (also referred to as in-phase component I, quadrature component Q; or real and imaginary part). These x-components and y-components are separately converted by demodulation and converter units 51-54 into digital complex samples px(n)=$X_I$(n), $X_Q$(n) (=$X_I$(n)+j $X_Q$(n)) and py(n)=$Y_I$(n), $Y_Q$(n) in the electrical domain. The complex samples $X_I$(n), $X_Q$(n) and $Y_I$(n), $Y_Q$(n) still carry the information of the optical component signals Sx and Sy (which are usually not the transmitted signals but contain parts of the two optical signals $S_H$ and $S_V$). Two dispersion compensation units 61, 62 (respectively 61F/62F) correct separately the orthogonal samples $X_I$(n), $X_Q$(n) of the x-component signal and the orthogonal samples $Y_I$(n), $Y_Q$(n) of the y-component signal and output corrected complex samples qx(n)=$X_{IC}$(n), $X_{QC}$(n) and qy(t)=$Y_{IC}$(n), $Y_{QC}$(n) respectively. Ignoring the timing recovery 7, known to those skilled in the art and not a part of the invention, the corrected complex samples qx(n) and qy(n) are fed to a FIR (finite impulse response) butterfly filter 8 (a digital processor unit), which reconstructs the two transmitted signals $S_H$, $S_V$ in a sample format $H_I$(n), $H_Q$(n) and $V_I$(n), $V_Q$(n). A following carrier recovery unit 9 corrects frequency and phase difference of the local oscillator 2. And a symbol decision unit 10 compares the reconstructed samples (symbols) with threshold values and outputs data signals $H_{OUT}$ and $V_{OUT}$ (e.g. if a symbol corresponds to two bits) $H_{OUT}$=$H_{OUTI}$, $H_{OUTQ}$; $V_{OUT}$=$V_{OUTI}$, $V_{OUTQ}$; I, Q—components are not shown).

As mentioned before, the x-polarisation signal and y-polarisation signal of a polmux signal are separately compensated in these embodiments. Common compensation is of course also possible. A low cost solution may use only one compensation circuit and use the same compensation function for both polarisation signals.

Figure 7:
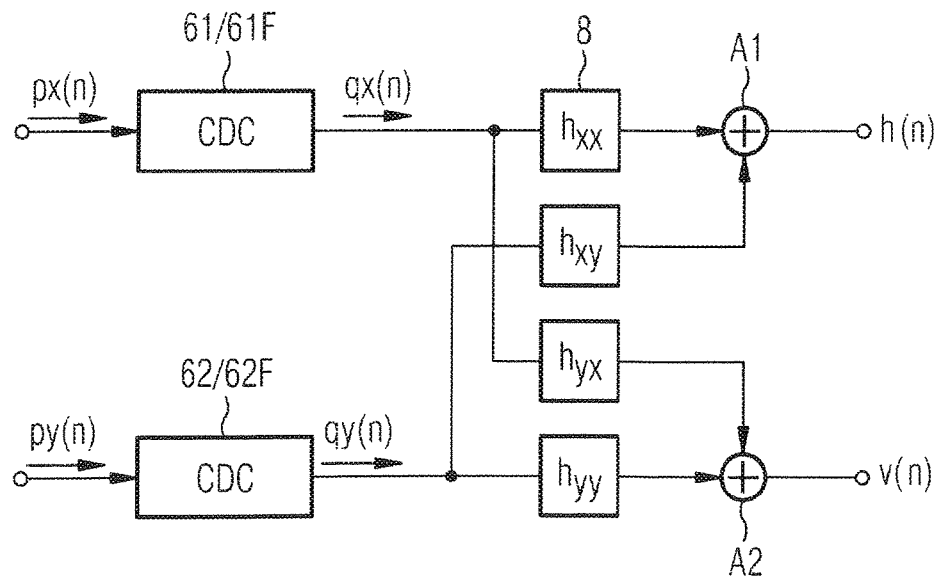
FIG. 7 shows a schematic block diagram of a dispersion compensation unit and butterfly stages.

FIG. 7 shows a more detailed block diagram of the chromatic dispersion compensation (CDC) units 61/61F, 62/62F and the butterfly filter 8 connected in series (clock recovery block not shown). The butterfly filter includes four FIR filters and two adders A1, A2.

The complex samples px(n) of the component signal Sx and py(n) of the component signal Sy are dispersion separately corrected and the corrected complex samples qx(n) and qy(n) are fed to the butterfly filter 8. The butterfly filter 8 reconstructs the received polmux signals $S_H$ and $S_V$ according to adaptive transfer functions $h_{xx}$–$h_{yy}$ in the form of corrected complex samples h(n)=$H_I$(n), $H_Q$(n) and v(n)=$V_I$(n), $V_Q$(n).

It is also possible to derive the number of taps required for the following TD FIR butterfly filter from the standard deviation of the estimation error.

If a conventional polmux receiver comprising a polarisation control and performing non-coherent demodulation is used both compensation units 61, 62 are designed for processing real sample values only.

As mentioned before, the x-polarisation signal and y-polarisation signal of a polmux signal are separately compensated in these embodiments. A low cost solution may use only one control circuit and the same compensation function for both polarisation signals.

The present invention is not limited to the details of the above described principles. The scope of the invention is defined by the appended claims and all changes and modifications as fall within the equivalents of the scope of the claims are therefore to be embraced by the invention.

REFERENCE SIGNS 1 polarisation beam splitter
2 local oscillator
3 first 90° hybrid
4 second 90° hybrid
5 demodulation and converter unit
6 dispersion compensation unit
61 first dispersion compensation unit
62 second dispersion compensation unit
7 clock recovery unit
8 FIR butterfly filter
9 carrier recovery unit
10 symbol decision unit
11 FIR compensation filter
12 reference value calculation unit
13 comparison unit
14 control unit
141 control section
142 error storage
15 function storage
16 FFT unit
17 correction unit
18 IFFT unit
19 delay
$S_{IN}$ received signal
CW constant wave signal
$S_{IH}$, $S_{IV}$ received polmux signal
Sx, Sy component signals
$X_I$, $X_Q$ orthogonal x-components
$y_I$, $y_Q$ orthogonal y-components
p(n) digital samples
$X_I$(n), $X_Q$(n) complex x-samples
$Y_I$(n), $Y_Q$(n) complex y-samples
$X_{IC}$(n), $X_{QC}$(n) corrected x-samples
$Y_{IC}$(n), $Y_{QC}$(n) corrected y-samples
$H_{OUT}$, $V_{OUT}$ output signal values
p(n) digital samples
px(n) complex x-samples
py(n) complex y-samples
p(n) complex samples
h transfer function
q(n) corrected samples
qx(n) corrected samples of px(n)
qy(n) corrected samples of py(n)
hx(n) reconstructed H signal
hy(n) reconstructed V signal
$H_I$(n), $H_Q$(n) samples of the H signal
$V_I$(n), $V_Q$(n) samples of the V signal
T(M) filter compensation function
C(N) spectral compensation function
$\epsilon$ estimated error value
$\epsilon_{MIN}$ estimated minimum error value
$\epsilon_{MINC}$ calculated minimum error value
$R_1$, $R_1$ reference values

The invention claimed is:

1. A method for adaptive dispersion compensation, which comprises the steps of:
   demodulating a received optical signal and converting the received optical signal into digital samples;
   feeding the digital samples to a compensation filter;
   setting the compensation filter to a filter compensation function according to a dispersion value;
   outputting corrected samples from the compensation filter;
   calculating comparison values from the corrected samples;
   calculating an estimated error value from the corrected samples and storing an estimated minimum error value;
   applying further compensation functions according to further dispersion values altered by dispersion variations within a predetermined dispersion range; and
   setting the compensation filter to an optimal filter compensation function assigned to the estimated minimum error value.

2. The method according to claim 1, which further comprises performing at least a second iteration process with higher resolution applying smaller dispersion variations in a minimum error value range of a preceding iteration process.

3. The method according to claim 2, which further comprises calculating sliding average error values and setting the compensation filter or a compensation unit according to an optimal dispersion value associated to a calculated minimum error value.

4. The method according to claim 1, which further comprises applying twofold oversampling and deriving a first comparison value from an average power of odd samples and a second comparison value from an average power of even samples.

5. The method according to claim 4, which further comprises calculating estimated error values according to $$\varepsilon(CD) = \sum_{n=1}^{N} (||q[2n-1]|^2 - R_1| + ||q[2n]|^2 - R_2|),$$

$$\forall\, W_{CD}(\Omega) = [CD_{min} : \delta CD : CD_{max}],$$

with q(n) being the corrected samples, $R_1$ being the average power of the odd samples, $R_2$ being the average power of the even samples, $\delta CD$ being the dispersion variation, and $W_{CD}(\Omega)$ being a set of possible values for chromatic dispersion CD.

6. The method according to claim 1, which further comprises the step of reading the compensation functions from a function storage unit.

7. The method according to claim 1, which further comprises the step of calculating the compensation functions according to different dispersion values in a predetermined range.

8. The method according to claim 1, which further comprises the steps of coherently demodulating and converting the received optical signal into complex samples, which are corrected into corrected complex samples.

9. The method according to claim 1, which further comprises the steps of:
receiving an optical polarization diversity multiplex signal and converting the optical polarization diversity multiplex signal into orthogonal x-components and y-components;
sampling the orthogonal x-components and y-components and converting them into digital complex samples; and
correcting separately the digital complex samples.

10. A method for adaptive dispersion compensation, which comprises the steps of:
demodulating a received optical signal and converting the received optical signal into digital samples;
feeding the digital samples to a Fast Fourier Transformation unit;
converting the digital samples into a spectral function;
setting a compensation unit to a spectral compensation function according to a dispersion value;
correcting the spectral function via the compensation unit and outputting a corrected spectral function;
converting the corrected spectral function into corrected samples, via an Inverse Fast Fourier Transformation;
calculating comparison values from the corrected samples;
calculating an estimated error value from the corrected samples and storing an estimated minimum error value;
applying a further spectral compensation function according to further dispersion values altered by dispersion variations within a predetermined dispersion range; and
setting the compensation unit to an optimal spectral compensation function assigned to the estimated minimum error value.

11. The method according to claim 10, which further comprises performing at least a second iteration process with higher resolution applying smaller dispersion variations with a minimum error value range of a preceding iteration process.

12. The method according to claim 11, which further comprises calculating sliding average error values and setting the compensation filter or a compensation unit according to an optimal dispersion value associated to a calculated minimum error value.

13. The method according to claim 10, which further comprises storing 0.25N-0.75N new samples and converting the new samples and 0.75N-0.25N former samples into a next spectral function, where N=number of stored samples.

14. The method according to claim 10, which further comprises applying twofold oversampling and deriving a first comparison value from an average power of odd samples and a second comparison value from an average power of even samples.

15. The Method according to claim 14, which further comprises calculating estimated error values (ε) according to $$\varepsilon(CD) = \sum_{n=1}^{N} (||q[2n-1]||^2 - R_1| + ||q[2n]||^2 - R_2|),$$

$$\forall\ W_{CD}(\Omega) = [CD_{min} : \delta CD : CD_{max}],$$

with q(n) being the corrected samples, $R_1$ being the average power of the odd samples, $R_2$ being the average power of the even samples, δCD being the dispersion variation, and $W_{CD}$(Ω) being a set of possible values for chromatic dispersion CD.

16. The method according to claim 10, which further comprises the step of reading the compensation functions from a function storage unit.

17. The method according to claim 10, which further comprises the step of calculating the compensation functions according to different dispersion values in a predetermined range.

18. The method according to claim 10, which further comprises the steps of coherently demodulating and converting the received optical signal into complex samples, which are corrected into corrected complex samples.

19. The method according to claim 10, which further comprises the steps of:
receiving an optical polarization diversity multiplex signal and converting the optical polarization diversity multiplex signal into orthogonal x-components and y-components;
sampling the orthogonal x-components and y-components and converting them into digital complex samples; and
correcting separately the digital complex samples.

20. A configuration for dispersion compensation, comprising:
a receiver having a demodulation and converter unit outputting digital samples of a received optical signal, and at least one dispersion compensator;
said at least one dispersion compensator containing:
a compensation filter receiving the digital samples and outputting corrected samples;
a reference value calculation unit receiving the corrected samples and calculating at least two comparison values;
a comparison unit comparing the corrected samples with the comparison values and outputting an estimated error value; and
a control unit setting said compensation filter to further filter compensation functions according to further dispersion values, to calculate estimated error values, and to store an estimated minimum error value, said control unit selecting an optimal filter compensation functions assigned to the estimated minimum error value.

21. The configuration according to claim 20, further comprising a function store storing a plurality of compensation functions.

22. The configuration according to claim 20, wherein said control unit has a control circuit calculating estimated error values according $$\varepsilon(CD) = \sum_{n=1}^{N} (||q[2n-1]||^2 - R_1| + ||q[2n]||^2 - R_2|),$$

$$\forall\ W_{CD}(\Omega) = [CD_{min} : \delta CD : CD_{max}],$$

with q(n) is the corrected samples, $R_1$ is an average power of odd samples, $R_2$ is an average power of even samples, and $W_{CD}$(Ω) is a set of possible values for chromatic dispersion CD.

23. The configuration according to claim 20, wherein said control unit performs a first iteration over a predetermined dispersion range and at least a second iteration over a range including the estimated minimum error value.

24. The configuration according to claim 20, wherein said control unit calculates a sliding average error and sets the compensation function according to the estimated minimum error value.

25. The configuration according to claim 20, wherein said dispersion compensation unit is configured for processing and correcting complex digital samples.

26. A configuration for dispersion compensation, comprising:
- a receiver having a demodulation and converter unit outputting digital samples, and at least one dispersion compensator unit;
- said at least one dispersion compensator unit containing:
  - a Fast Fourier Transformation unit converting the digital samples into a spectral function;
  - a correction unit receiving the spectral function and outputting a corrected spectral function;
  - an Inverse Fast Fourier Transformation unit converting the corrected spectral function into corrected samples;
  - a reference value calculation unit receiving the corrected samples and calculating comparison values;
  - a comparison unit comparing compensated samples with the comparison values and outputting an estimated error value; and
- a control unit setting a compensation unit to further spectral compensation functions according to further dispersion values, to calculate estimated error values, and to store an estimated minimum error value, said control unit selecting an optimal spectral compensation function assign to the minimum error value.

27. The configuration according to claim 26, further comprising a function store storing a plurality of compensation functions.

28. The configuration according to claim 26, wherein said control unit has a control circuit calculating the estimated error values according $$\varepsilon(CD) = \sum_{n=1}^{N} (||q[2n-1]||^2 - R_1| + ||q[2n]||^2 - R_2|),$$

$$\forall\, W_{CD}(\Omega) = [CD_{min} : \delta CD : CD_{max}],$$

with q(n) is the corrected samples, $R_1$ is an average power of odd samples, $R_2$ is an average power of even samples, and $W_{CD}(\Omega)$ is a set of possible values for chromatic dispersion CD.

29. The configuration according to claim 26, wherein said control unit performs a first iteration over a predetermined dispersion range and at least a second iteration over a range including the estimated minimum error value.

30. The configuration according to claim 26, wherein said control unit calculates a sliding average error and sets the compensation function according to an estimated minimum error value.

31. The configuration according to claim 26, wherein said dispersion compensation unit is configured for processing and correcting complex digital samples.

* * * * *